A. HUPP.
MAIL EXCHANGE SYSTEM.
APPLICATION FILED APR. 19, 1910.
1,020,609.
Patented Mar. 19, 1912.
12 SHEETS—SHEET 1.
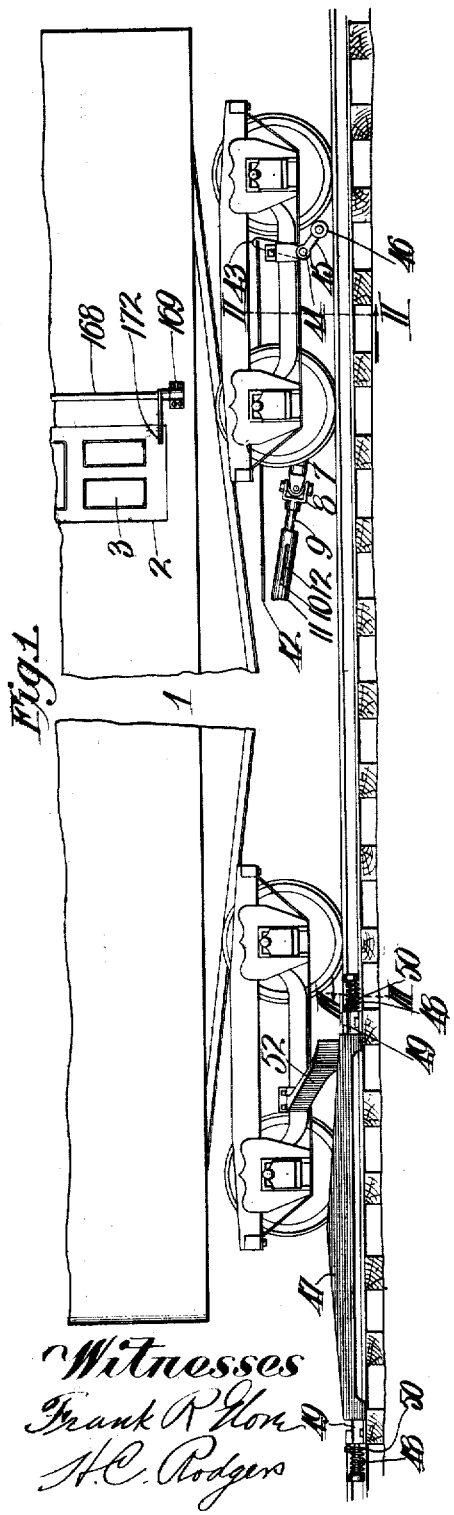
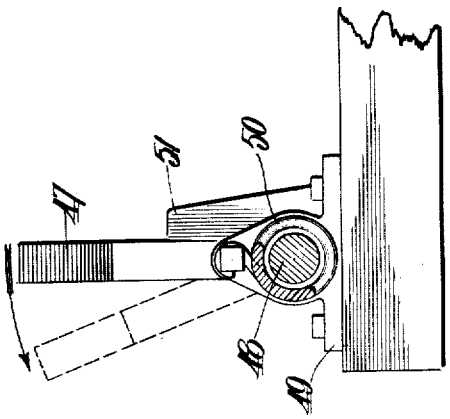
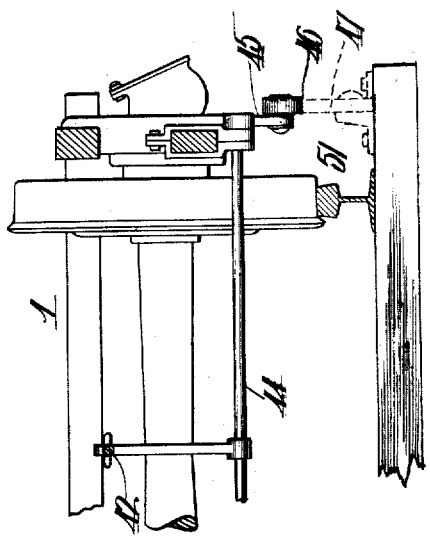
Witnesses
Frank R Lion
H. C. Rodgers
Inventor
Albert Hupp
By George H Thorpe Atty.

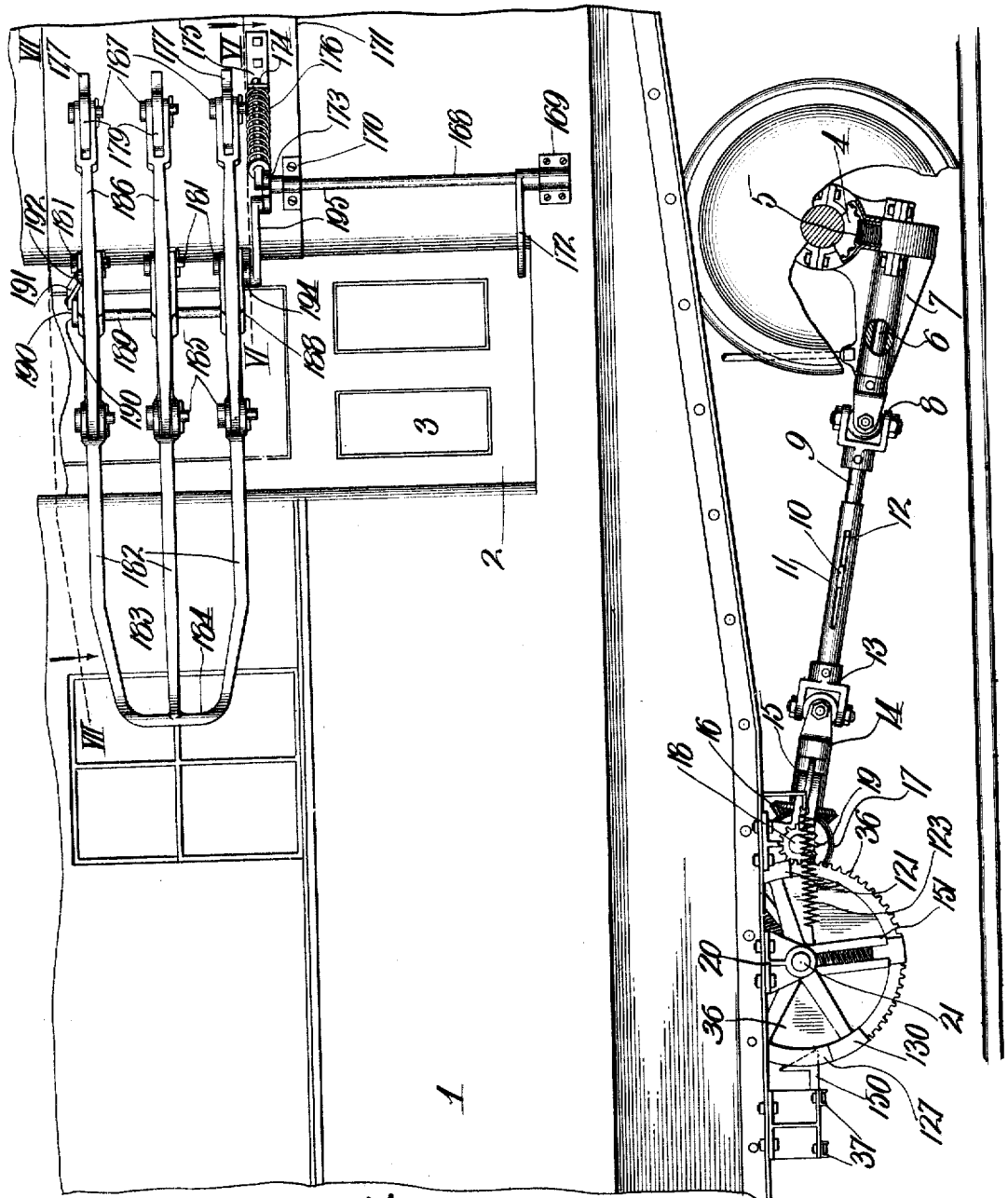

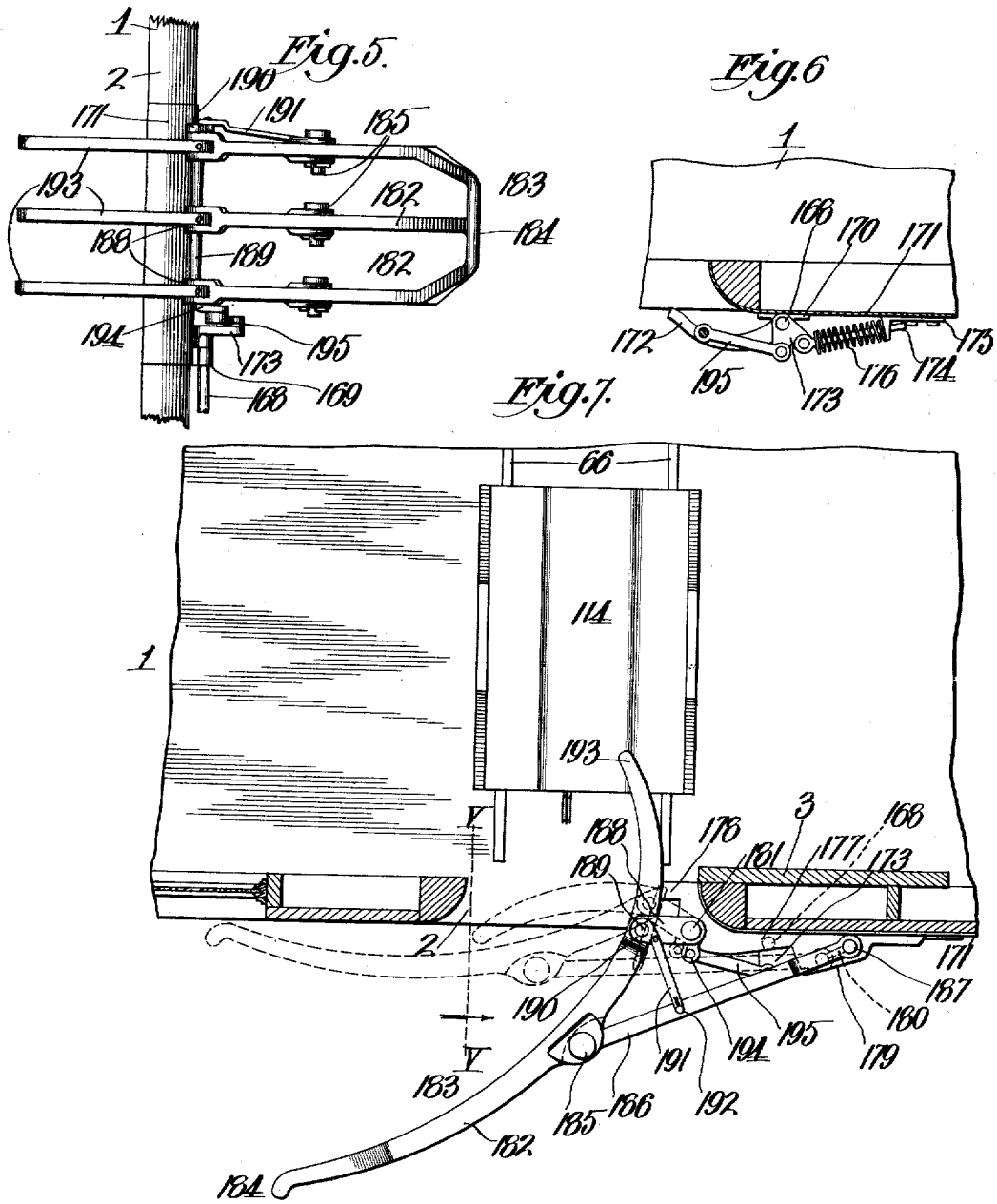

A. HUPP.
MAIL EXCHANGE SYSTEM.
APPLICATION FILED APR. 19, 1910.
1,020,609.
Patented Mar. 19, 1912.
12 SHEETS—SHEET 4.
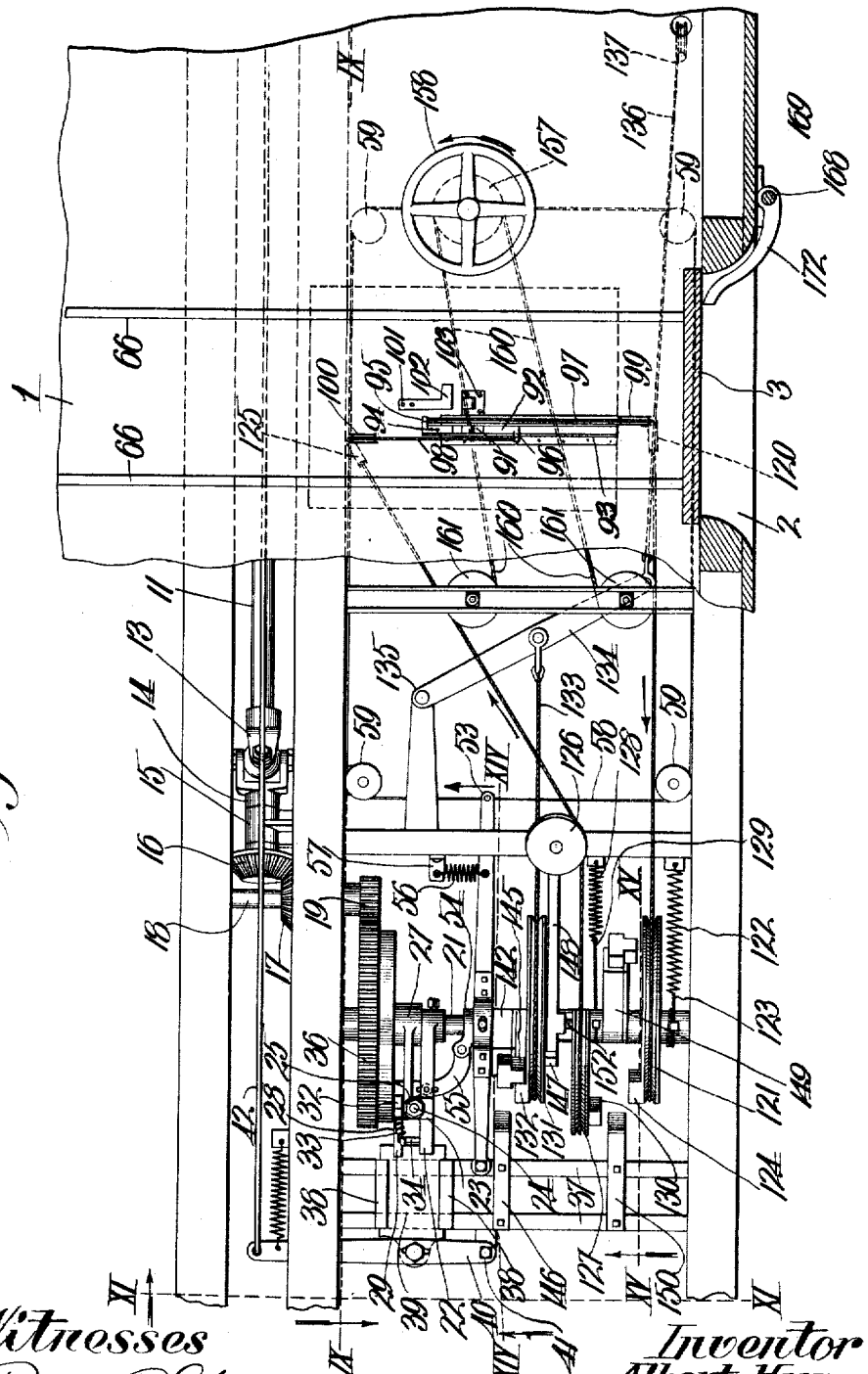
Witnesses
Frank R Horn
H. C. Rodgers
Inventor
Albert Hupp
By George W. Thorpe Atty.

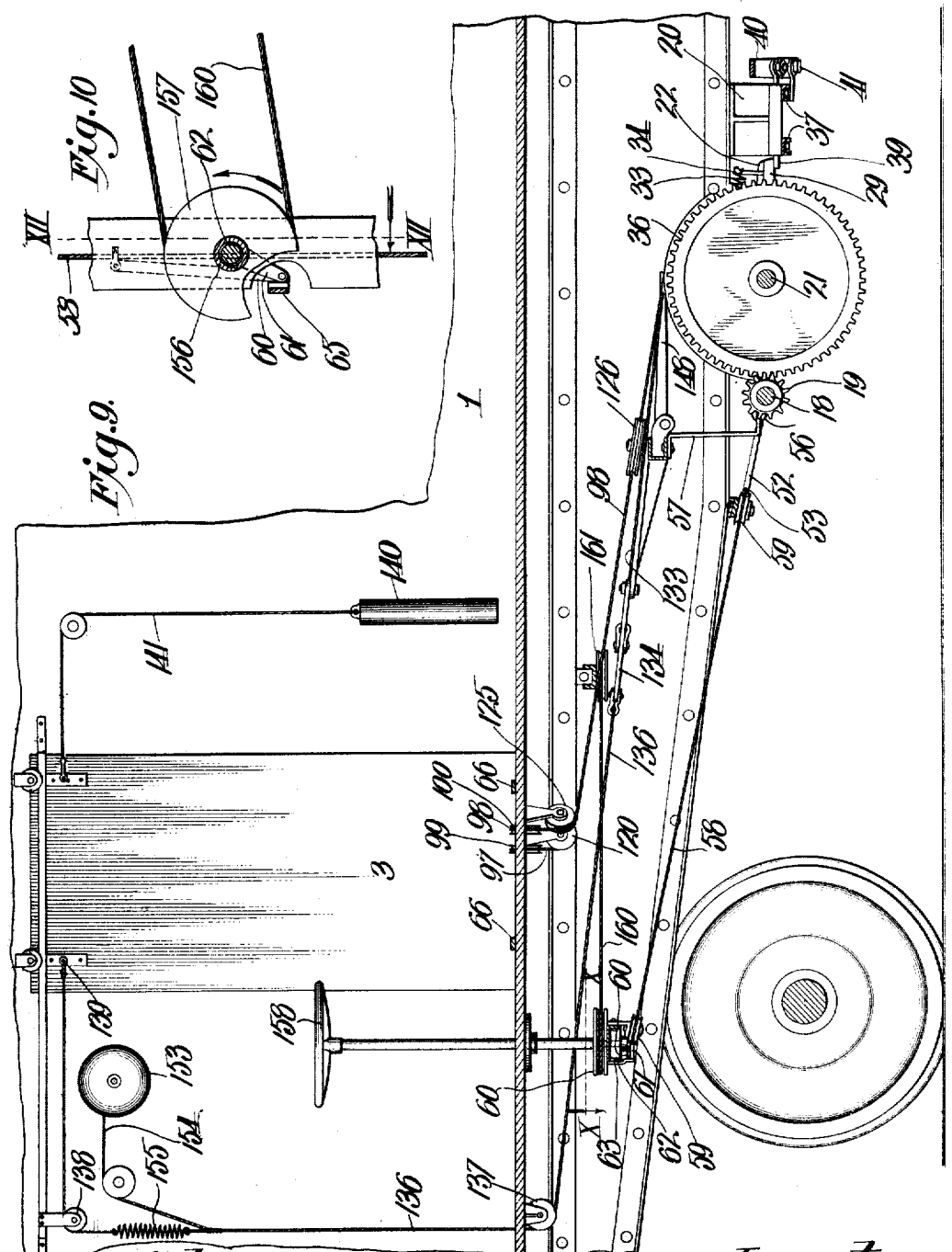

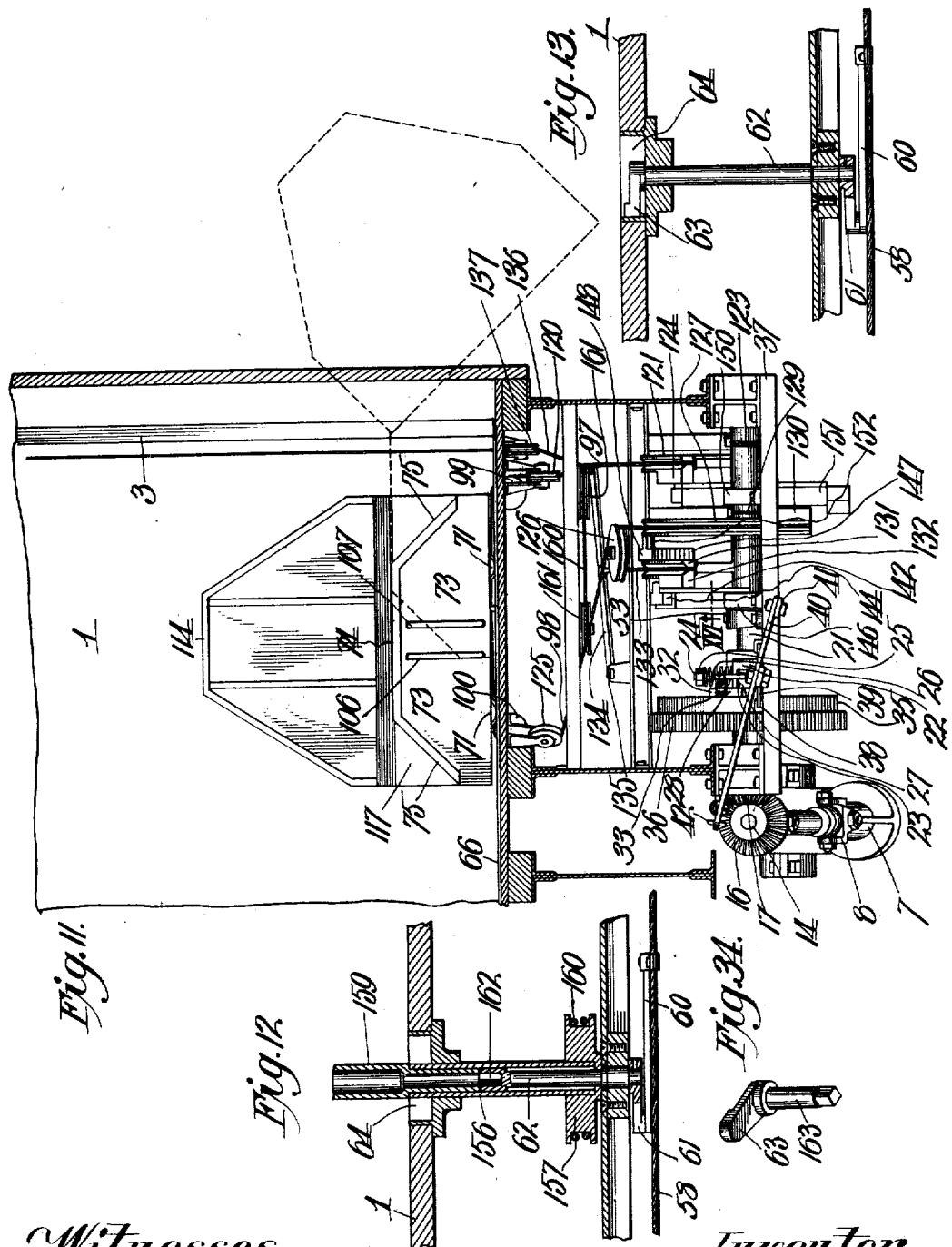

A. HUPP.
MAIL EXCHANGE SYSTEM.
APPLICATION FILED APR. 19, 1910.
1,020,609.
Patented Mar. 19, 1912.
12 SHEETS—SHEET 7.
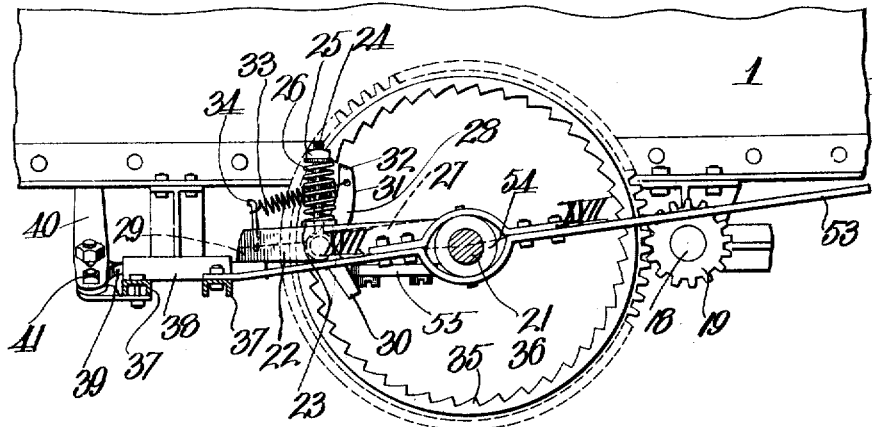
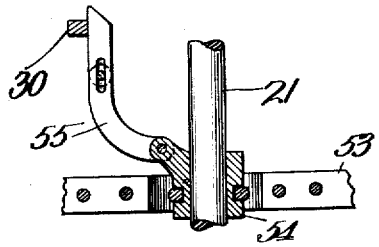
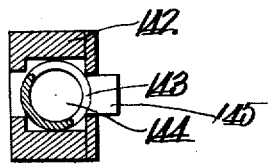
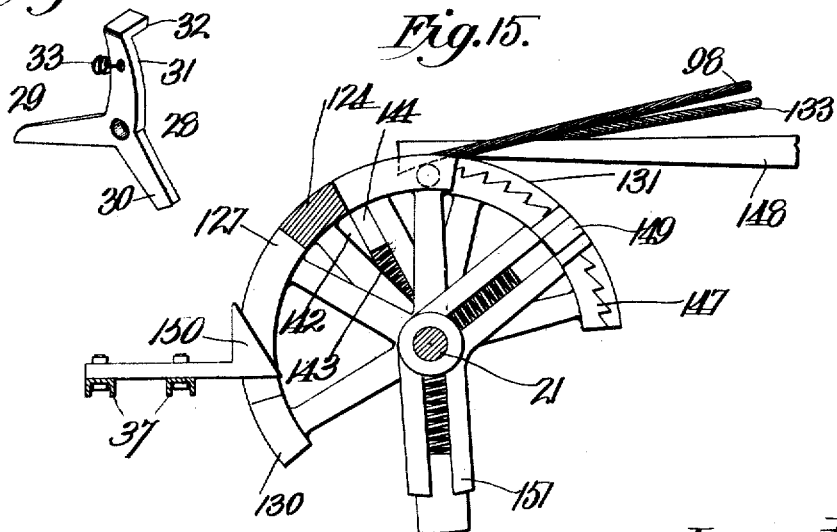
Witnesses
Frank R. Hon
H. C. Rodgers
Inventor
Albert Hupp
By George H. Thorpe Atty.

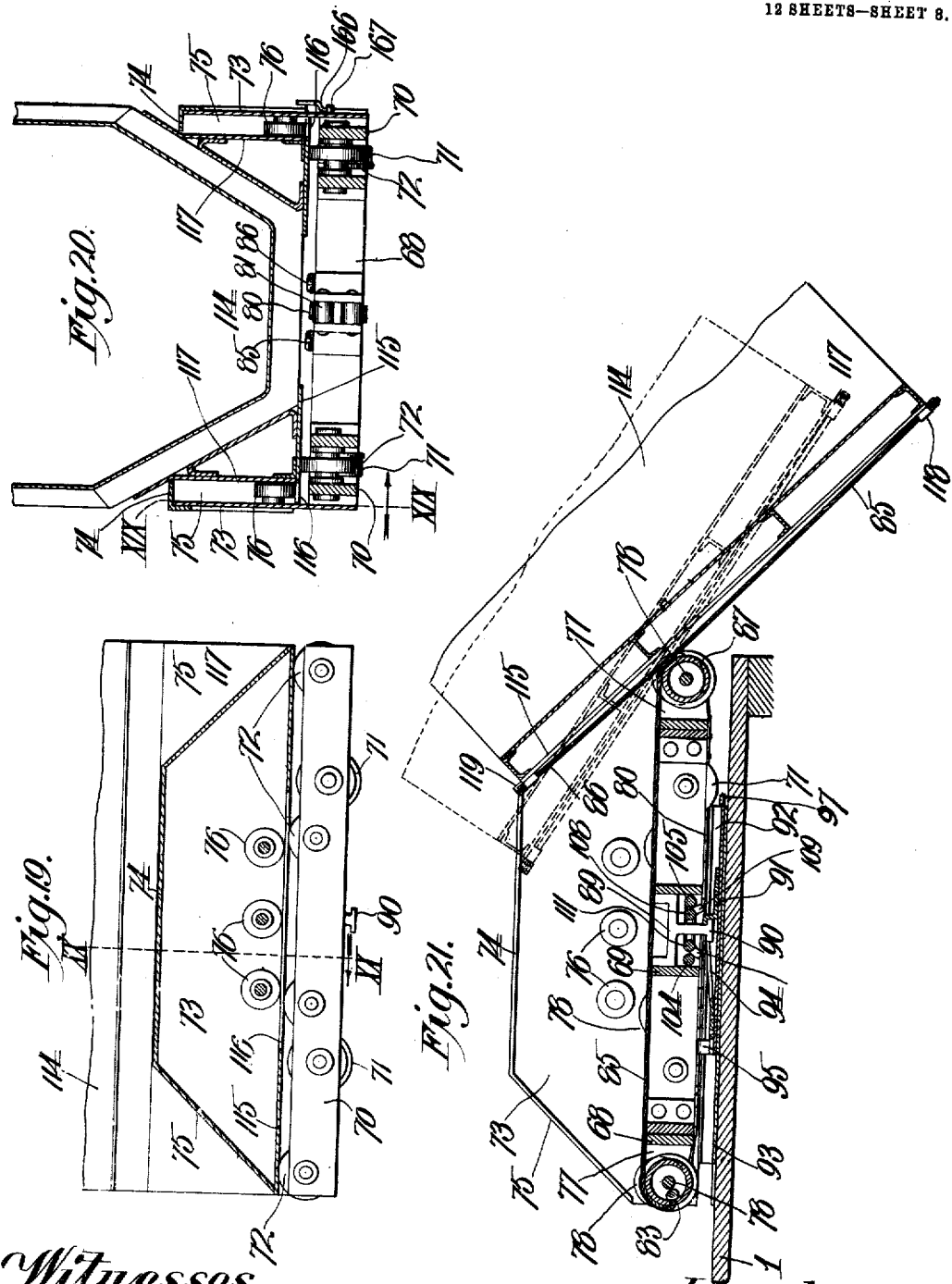

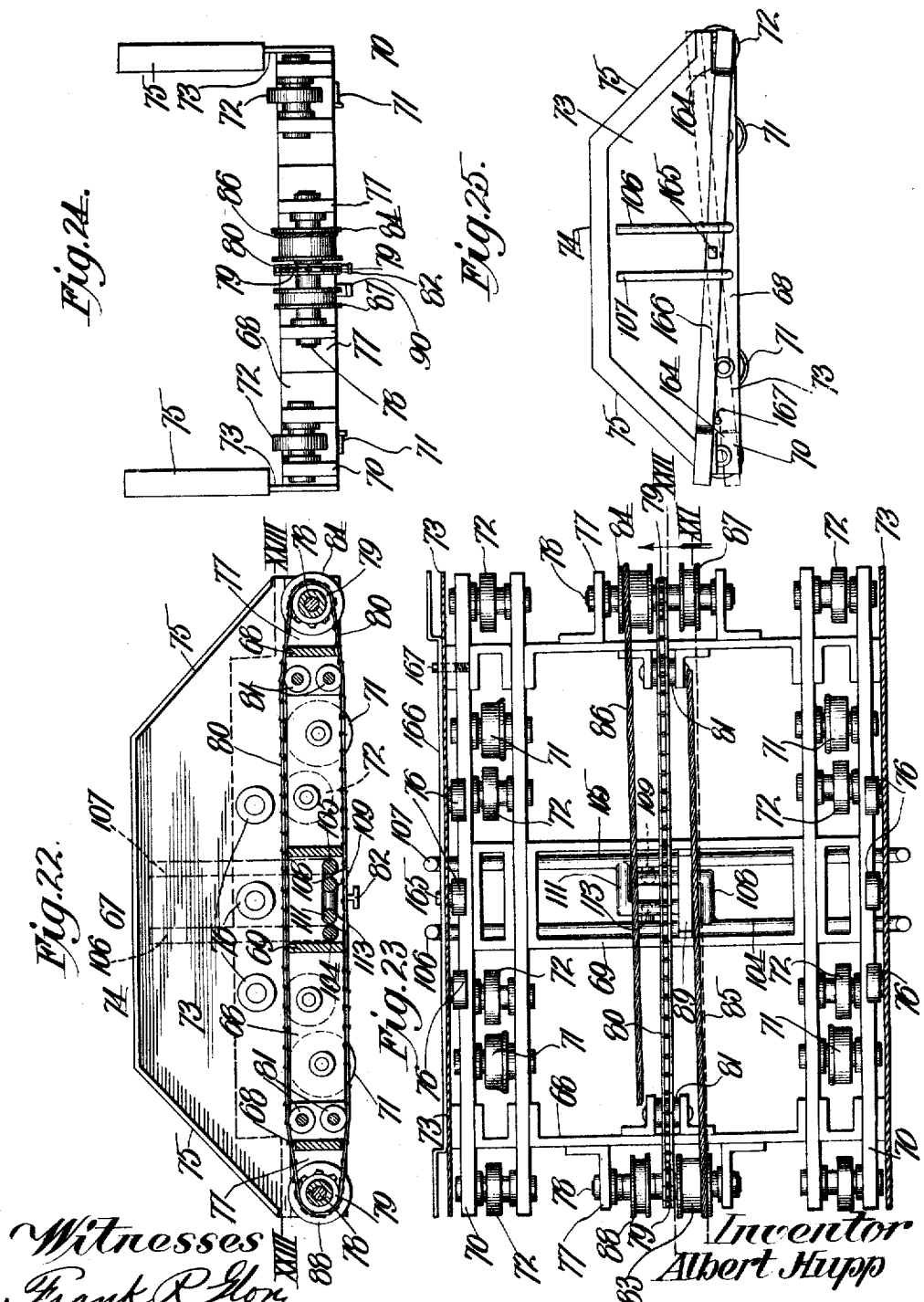

A. HUPP.
MAIL EXCHANGE SYSTEM.
APPLICATION FILED APR. 19, 1910.
1,020,609.
Patented Mar. 19, 1912.
12 SHEETS—SHEET 10.
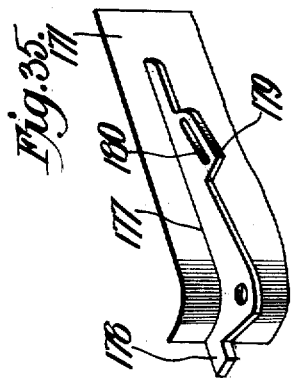
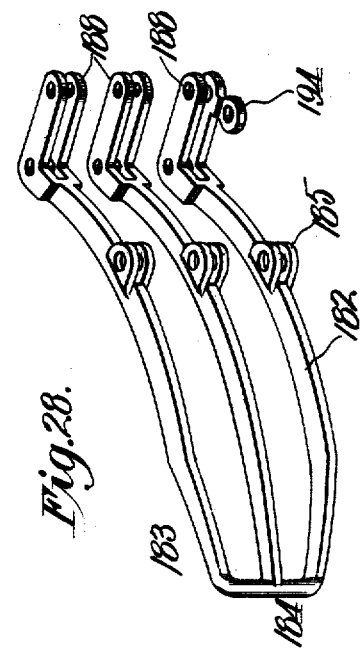
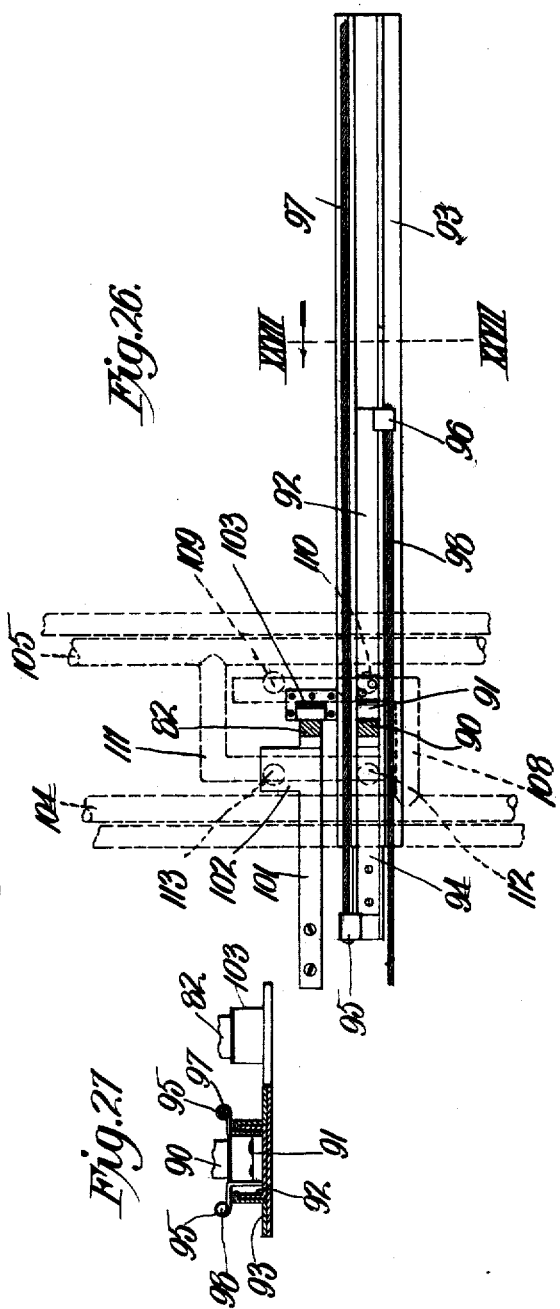
Witnesses
Frank R. Hor
H. C. Rodgers
Inventor
Albert Hupp
By George F. Thorpe Atty.

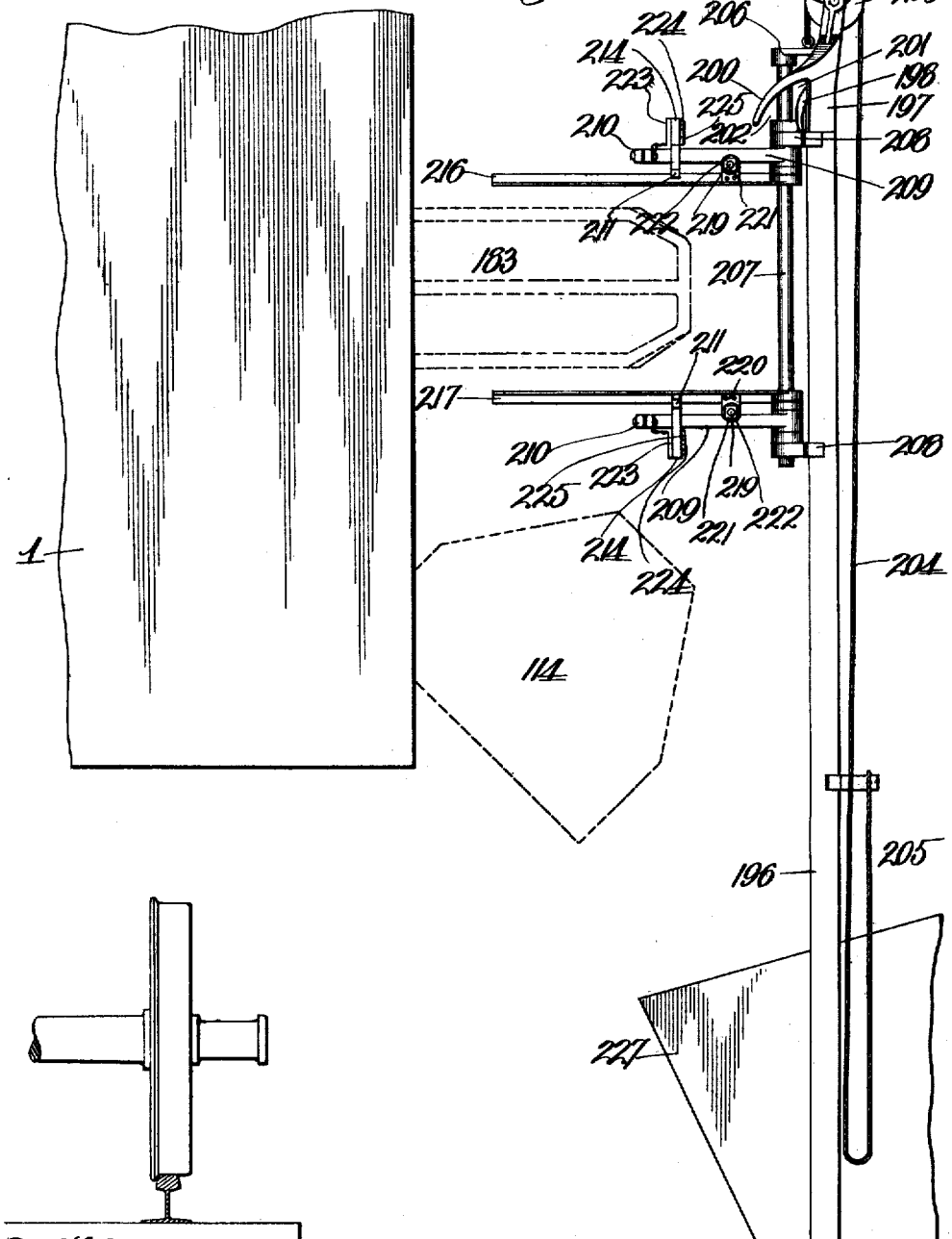

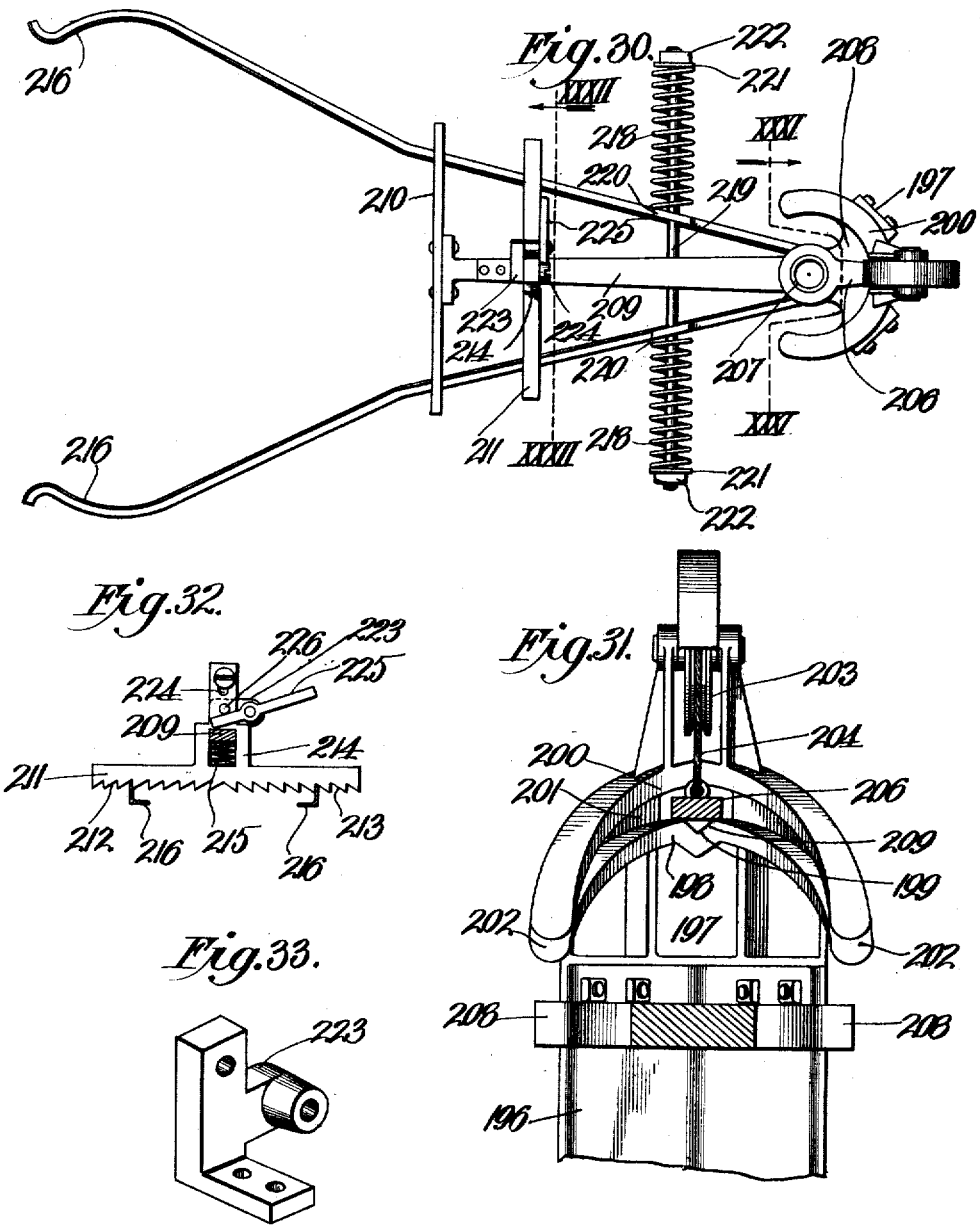

UNITED STATES PATENT OFFICE.

ALBERT HUPP, OF KANSAS CITY, MISSOURI.

MAIL-EXCHANGE SYSTEM.

1,020,609.  Specification of Letters Patent.  Patented Mar. 19, 1912.

Application filed April 19, 1910. Serial No. 556,443.

*To all whom it may concern:*

Be it known that I, ALBERT HUPP, a citizen of the United States, residing at Kansas City, in the county of Jackson and State of Missouri, have invented certain new and useful Improvements in Mail-Exchange Systems, of which the following is a specification.

This invention relates to mail exchange systems and more especially to that type for effecting an exchange of mail between stations along the line of a railroad and the trains traveling over such road, and my primary object is to produce automatic means for efficiently and reliably effecting an exchange of mail in any quantity between the stations and a train passing thereby without injury to the mail pouches and within a stretch of ground set apart for the purpose.

A further object is to produce apparatus whereby mail may be automatically delivered from the train without setting the receiving apparatus.

A further object is to produce means whereby the delivery apparatus may be operated manually.

Another object is to produce means whereby the delivery apparatus may be thrown out of gear to prevent its delivering operation.

A still further object is to produce apparatus of the character outlined by which mail may be exchanged at either side of the car desired.

Another object is to provide a car with an external receiver which can not be opened or "set" unless the car door is first opened.

Another object is to produce a station crane from which a mail pouch can be reliably withdrawn from the receiver of a passing car and which embodies pouch clamping jaws which swing away from the car as the pouch is removed and move downward and which can be readily and easily reëlevated to operative position after receiving another pouch.

With these general objects in view and others as hereinafter appear, the invention consists in certain novel and peculiar features of construction and organization as hereinafter described and claimed; and in order that it may be fully understood reference is to be had to the accompanying drawings, in which—

Figure 1, is a fragmentary side elevation of a mail car and section of track, equipped with apparatus embodying my invention. Fig. 2, is an enlarged section on the line II—II of Fig. 1. Fig. 3, is a still larger section on the line III of Fig. 1. Fig. 4, is an enlarged side view of a portion of the mail car with certain parts broken away to expose features otherwise hidden. Fig. 5, is a vertical section through one of the door openings of the car, on the line V—V of Fig. 7, to show a portion of the car receiving apparatus when set in operative position, as distinguished from said apparatus in Fig. 4, which shows the car-receiving apparatus in folded or inoperative position. Fig. 6, is a section on the dotted line VI—VI of Fig. 4, when the car-receiving apparatus is set in operative position as shown in Fig. 5. Fig. 7, is a horizontal section on the line VII—VII of Fig. 4, with the car receiving apparatus in operative position in full lines and in inoperative position in dotted lines. Fig. 8, is a horizontal section of a part of the car with the floor forward of the door broken away to expose mechanism below the same. Fig. 9, is a vertical section on the line IX—IX of Fig. 8. Fig. 10, is a section on the line X—X of Fig. 9. Fig. 11, is a section on the line XI—XI of Fig. 8, and also shows the delivery apparatus, not shown in Fig. 8. Fig. 12 is an enlarged vertical section on the line XII—XII of Fig. 10. Fig. 13, is a vertical section corresponding approximately to Fig. 12, of the preferred type of means for throwing the delivery apparatus out of gear with the means for automatically operating it. Fig. 14, is an enlarged vertical section on the line XIV—XIV of Fig. 8. Fig. 15, is a section on the line XV—XV of Fig. 8. Fig. 16, is an enlarged section on the dotted line XVI of Fig. 11. Fig. 17, is an enlarged section on the line XVII—XVII of Fig. 14. Fig. 18, is a detail perspective view of a pawl forming a part of the apparatus. Fig. 19, is a section of the basket on the line XIX—XIX of Fig. 20. Fig. 20, is a section on the line XX—XX of Fig. 19. Fig. 21, is a sectional view of the truck and basket on the line XXI of Fig. 23, showing the basket in dumping position as distinguished from the position of the same element in Figs. 19 and 20. Fig. 22, is a slightly enlarged section of the truck on the line XXII of Fig. 23. Fig. 23, is a section on the line XXIII—XXIII of Fig. 22. Fig. 24, is an end view of the truck. Fig. 25, is a side view of the truck on a reduced scale to disclose the adjustable means whereby the truck may be caused to dispose the car receiver in operative position. Fig. 26, is an enlarged section taken just below the bottom of the truck to show means for holding the same and the basket in normal position within the car and for effecting the outward and return movements of the truck. Fig. 27, is a section on the line XXVII—XXVII of Fig. 26. Fig. 28, is a detail perspective view of the main member of the receiver. Fig. 29, is a view showing the car in end view, a station receptacle for the mail discharged from the car, and a station crane from which the car receives mail in passing the station. Fig. 30, is a top view of the crane. Fig. 31, is an enlarged section on the line XXXI—XXXI of Fig. 30. Fig. 32, is a vertical section on the line XXXII—XXXII of Fig. 30. Fig. 33, is a detail perspective view of a bracket forming a part of the station crane. Fig. 34 is a detail perspective view of the upper part of the modified form of the rock-shaft shown in Fig. 13. Fig. 35, is a fragmentary perspective view of the plate which supports the receiver.

In said drawings, 1 indicates a mail car, 2 is one of the side door openings thereof, and 3 the customary slide door closing said opening.

4 is a worm wheel suitably secured rigidly on one of the axles of the rear truck, by preference, and said wheel meshes with a worm wheel 5 secured on shaft 6 journaled in a suitably supported bearing 7. Shaft 6 is connected by a universal joint 8 to member 9 of an extensible shaft, said member fitting in the sleeve member 11 and having a lug 10 engaging a slot 12 in the sleeve member, and said extensible shaft is connected by a universal joint 13 with a shaft 14 journaled in a suitably-supported bearing 15 equipped with a bevel gear 16 engaging a bevel gear 17 on a suitably journaled short transverse shaft 18 provided with a gear pinion 19.

20 indicates bearings pendent from the car, and 21 is a transverse shaft journaled therein. Rigidly secured to said shaft is an arm 22 provided with an ear 23 through which extends a pin 24 equipped with an adjustable collar or nut 25 and with a spiral spring 26 bearing at its opposite ends against said ear and collar or nut, the lower end of said pin being pivoted to the outer end of an arm 27 journaled on the shaft 21. A pawl 28 is pivotally carried by said arm 27 and embodies a stop arm 29, a trip-arm 30 and an arm 31 provided with a laterally projecting tooth 32, and said arm 31 is connected by a retractile spring 33 with a pin 34 carried by arm 22, the tendency of said spring being to operate the pawl so that the tooth 32 shall engage the ratchet wheel 35 formed integral with the gear wheel 36, meshing with gear pinion 19.

37 indicates a pair of transverse bars bearing a rigid relation to the car and connected by grooved guides 38 wherein a slidable plate 39 is mounted, and pivoted to said plate is a spring-retracted lever 40 fulcrumed at 41 to a point fixed with relation to bars 37, the opposite or inner end of the lever 40 being connected by a rod 42 to a crank arm 43 of the rock shaft 44, carried by the rear truck by preference, said rock shaft being equipped at its opposite or outer end with the crank arm 45 carrying an antifriction roller 46, for engagement with the cam-faced trip 47, secured on the roadway, at or near a station, at the outer side of the track. The crank arm 45 is adapted to be rocked upward in its passage up to the crest of the trip 47 and be reversely operated by the spring-retracted lever 40, in its movement upon the trip after passing the crest of the same, it being noted that its passage downward upon the trip prevents the slide plate 39 from being quickly restored to its original position, for a purpose which hereinafter appears.

In order to insure the clearance of snow and ice from the trip and therefore the proper operation of crank 45, the trip is provided at its ends with trunnions 48 pivoted in suitably supported bearings 49, and surrounded by springs 50 arranged to hold the trip against one or more stops 51, and in the path of travel of roller 46 and of a plow 52, secured by preference to the front truck of the car and adapted in passing to strike the upper inner edge of the trip and force it outward to substantially the position shown in dotted lines, Fig. 3, and then release it, and in such action dislodge any snow or ice which may be upon it. In practice the movement imparted to the trip by the plow and the springs is very quick and in both instances is attended by a jar sufficient to loosen and dislodge ice, as will be readily understood.

Referring now to the means for throwing shaft 21 out of gear with the gear 36 constantly driven while the car is in motion, 53 is a lever fulcrumed on one of the bars 37, by preference, and fitting around and connected in a well known manner to a collar 54 to slide the same on shaft 21, said collar being arranged to rotate with said shaft.

55 is a lever fulcrumed on arm 22 and pivoted at one end to the collar 54 and having its opposite end arranged to engage the trip arm 30 of the ratchet pawl 28.

The lever 53 is connected by a retractile spring 56 to a hanger 57, depending from a rigid part of the car and the free end of said lever is connected to a cable 58, guided around suitably supported sheaves 59 and pivotally connected to said cable is a link 60 pivoted to crank arm 61, of a vertical shaft 62, said shaft being suitably journaled and provided at its upper end with a handle 63 (see Fig. 13) occupying a cavity 64 in the upper bearing projecting upward through the floor of the car, it being noted by reference to Fig. 10, that a suitably supported stop 65 prevents the spring 56, which is under tension, (see Fig. 8) from swinging the free end of the lever inward.

When it is desired to operate lever 55 and thereby trip the pawl from engagement with the ratchet wheel 35, against the resistance of spring 33, the mail clerk through the medium of handle 63, turns the rock shaft 62 in the direction indicated by the arrow Fig. 10, against the resistance of spring 56 until the pivotal point of connection between the link 60 and crank 51, is at the opposite side of the center of shaft 62 from stop 65, thus leaving the spring 56 free to retract and swing lever 53 in the direction indicated by the adjacent arrow in Fig. 8, and thus cause lever 55 by forward pressure on arm 30, to trip the pawl from engagement with the ratchet wheel 35 against the resistance of spring 33, see Fig. 14. As a result of this action the shaft is thrown out of gear with the master gear wheel 36, so that the withdrawal of the slide-plate 39, through the operation of the rock shaft 40 by trip 47 shall not result in the rotation of shaft 21 to effect the operation of the delivery apparatus hereinafter described.

Extending transversely of the car and secured upon the floor of the same between the door openings 3 are the parallel rails 66 of a trackway and mounted upon said trackway is a wheeled truck 67, constructed as follows:—68 is a rectangular frame braced centrally by a transverse skeleton frame 69 and flanked by a pair of bars 70 rigidly connected to and spaced some distance outward of the side bars of the frame, and arranged between the side bars of the frame and bars 70, and suitably journaled are the wheels 71 of the truck, the same being flanged at their inner edges to guard against dislocation from the trackway. 72 are rollers arranged between the sides of the frame and bars 70 and projecting above the upper edges of the same for a purpose which hereinafter appears. 73 are guard walls bearing a rigid relation to the truck outward of bars 70 and said guard walls project upward a considerable distance above rollers 72, and are of substantially semi-hexagonal form in side view and are provided with inwardly projecting horizontal flanges 74 and inclined end flanges 75, and carried by and bearing a journaled relation to the guard walls are anti-friction rolls 76. 77 are brackets projecting from the end bars of the truck frame 68 and journaled in said brackets are short transverse shafts 78 upon which are rigidly secured by preference, sprocket wheels 79, connected by an endless chain 80, the upper and lower strands of the chain being respectively held for the greater part of their length above and below the frame by anti-friction rolls 81, suitably supported from the end bars of the frame, and secured to and depending from the lower strand of the chain is a hook 82, the same being preferably of the double-hook type, so as to be capable of performing its proper function irrespective of the door opening through which the mail is delivered. 83 and 84 are similar drums rigid with sprocket wheels 79, 85 and 86 indicating cables secured at their opposite ends respectively to drums 83 and 84. When the truck occupies its normal position within the car said cables are partly wound upon the drums and when the truck moves to the right the cable 85 is partly unwound from drum 83 and cable 86 is more fully wound upon drum 84, opposite movement of the truck reversing the action of the cables with respect to the drums. Bearing a journaled relation to the shaft-carrying drum 84 and in line with drum 83 is a sheave 87, a similar sheave 88 being arranged at the opposite end of the truck and in line with the drum 84, said sheaves forming bending points for the cables 85 and 86 respectively when the basket hereinafter described performs its delivery function at the opposite sides of the car. 89 is a bar extending longitudinally of the truck and carried by and within the skeleton frame 69 at one side of the longitudinal center of the truck and depending from said bar is a double hook 90, one terminal of the same being adapted to enter the pocket 91 of the slidable and preferably U-shaped channel 92 fitting in a flanged channel guide 93 extending transversely of the car, the slidable channel being equipped at the opposite side of the hook 90 with a flat spring 94 for engagement with the opposite terminal of said hook when the first-named terminal is within the pocket. At its inner end the slidable channel is provided with an offset arm 95, and at its outer end with an oppositely projecting offset arm 96, and connected to the arm 95 is an outwardly extending cable 97, and to the arm 96 is connected one end of an inwardly extending cable 98, said cables extending through the floor of the car and over suitably secured sheaves 99 and 100 located beyond the opposite ends of the flanged channel guide 93. Secured to the floor of the car below the chain is a spring 101, having its free end offset as at 102, and said spring is adapted to engage the inner terminal of the double hook 82 when the outer terminal of said hook is in engagement with the pocket piece 103 secured to the floor of the car. (See Figs. 8 and 26). Extending transversely through the truck within the skeleton frame 69 is a pair of rock shafts 104 and 105, equipped at their outer ends with upwardly projecting handles 106 and 107, respectively. Within the skeleton frame shaft 104 is provided with a right-angle shaped crank arm 108 projecting toward shaft 105 and provided with depending lugs 109 and 110 for respective engagement with the offset end 102 of spring 101 and the free end of the spring 94, to depress the free ends of said springs below the path of hooks 82 and 90. A similar crank arm 111 projects from shaft 105 and is equipped with depending lugs 112 and 113 for depressing the free ends of springs 94 and 101 respectively, below the double hooks 90 and 82, and in this connection it is desired to state that the proper rock shaft 104 or 105 is operated to depress the springs only when it is desired to shift the position of the truck from one side of the car to the other in order to effect the delivery of the mail at the opposite side of the car, and when it is desired to prevent the operation of the truck when passing a station where no mail is to be delivered or received.

114 indicates the basket, the same being of substantially U-form in end view, see Fig. 20, with the lower portions of its sides tapering inward and downward by preference, so as to fit betwen the flanged walls 73 of the truck, and secured to the lower edges of the basket are horizontal plates 115 which rest upon rolls 72 and underlie the flanges of the guard walls 73, and said plates are provided with slots 116 through which rolls 76 may pass when the inner end of the basket tilts upward or downward as hereinafter explained, and said plates are braced near their slotted edges by vertical plates 117. The outer end of cable 85 is attached at 118 to the outer end of the basket and the inner end of the cable 86 is attached to the inner end of the basket at 119, see Fig. 21. The cable 97 from below the floor of the car extends under and around a suitably guided sheave 120 to a sheave segment 121 journaled on shaft 21 and said cable is kept taut at all times by a retractile spring 122, connected at one end to a fixed part of the car and at the other end to a cable 123 wound partly around and secured to the hub of said segment and said segment is formed at one side with a lug 124. The cable 98 from below the floor of the car extends under and around a suitably supported sheave 125, and thence diagonally outward and forward around a guide sheave 126, to a sheave segment 127 corresponding to sheave segment 121, and cable 98 is kept taut by a spring 128 attached to a fixed part of the car and to a cable 129 wound partly around and secured to the hub segment 127, the last-named segment also having a lug 130 at one side. 131 is a similar sheave segment journaled on shaft 21 and provided at one side with a lug 132, and said segment is connected by a cable 133 to a lever 134 fulcrumed at 135 to a point fixed with relation to the car structure, the free or outer end of said lever being connected to a cable 136 which extends around a suitably supported sheave 137 and up into the car and around a suitably supported sheave 138 and is attached at 139 to the slidable door 3, the door being held normally closed by a weight 140 through the medium of a suitably guided cable 141.

142 is a slotted arm rigidly mounted on shaft 21, and fitting in said arm is an expansive coil spring 143 tending to hold a plunger 144 pressed toward the outer or free end of the arm, said plunger being provided with a laterally projecting lug 145, adapted once in each revolution, to engage lug 132 and thereby rotate the shaft segment 131 and through the connection described open the door 3, said plunger immediately after effecting the opening of the door coming in contact with cam 146 secured to cross bars 37, which represses the plunger so that it may pass said cam and the lug 132 of sheave segment 131, the door being held open by the engagement with one of the ratchet teeth 147 of the sheave segment 131, of gravity catch 148, pivotally supported from a fixed point on the car, see Figs. 8 and 15.

149 is a part corresponding in all respects to parts 142 to 145 inclusive, the lug of the plunger of said part 149 immediately after the door is opened coming in contact with the lug 124 of sheave segment 121 and rotating the latter so as to draw cable 97 in the direction indicated by the adjacent arrow, Fig. 8. This action causes the truck to travel outward through the door opening until its outer end is substantially flush with the outer side of the car and through said outward movement of the truck, cable 98 is drawn in the direction indicated by the arrow adjacent thereto, Fig. 8, so as to swing segment 127 in the opposite direction to segment 121, these segments always moving together but in reverse directions, and when the truck has advanced to the position explained, the spring actuated plunger of part 149 engages a cam 150 corresponding to cam 146, and is repressed thereby out of the path of lug 124 of the sheave segment 121. The movement of the truck referred to is relatively slow and during such movement the basket moves with and in the same direction as but at greater speed than the truck owing to the fact that the chain is fixed to the pocket piece 103 of the floor, that is to say, as the truck moves along the trackway, the loop of the chain extending around the sprocket wheels of the truck moves with it and at the same time the chain travels and imparts rotary movement to said sprocket wheels and corresponding movement to the drums 83 and 84, the drum 84 winding cable 86 upon it and therefore pulling the basket outward upon the truck and cable 85 paying out from the drum 83 to permit such independent movement or travel of the basket. Shortly after the center of gravity of the basket passes beyond the foremost rollers 72 of the truck, the rear ends of its laterally projecting plates 115 have cleared the foremost roller 76, this position of the basket being attained as the outward movement of the truck ceases. The basket therefore immediately tilts by gravity to the position shown in full lines Fig. 21 until its plates 115 rearward of their slots 116 come in contact with the front inclined flanges 75 of the truck, this dumping action of the basket resulting in the discharge of the mail pouches with which the basket is charged, as will be readily understood. Shortly after the discharge of the mail pouches is accomplished, the lug of the part 151 corresponding to part 149 comes into engagement with the lug 130 of sheave segment 127 and rotates the same back to the position shown in Figs. 8 and 15, for the purpose of reversing the movement of the cables 97 and 98 and restoring the basket and the sheave segments to normal position it being obvious that the action of the sprocket chain 80 is also reversed to cause cable 85 to return the basket and cable 86 to permit such return, it being noticed by reference to Fig. 21, particularly, that when the basket is drawn back the rear ends of its plates 115 slide against the underside of flanges 74 of the truck and that after the basket through gravitative action rocks downward at its inner end, it will ride upon the outermost roller 76 and then the other rollers 76 successively until the rear ends of the slots 116 clear the rearmost rollers when the basket will drop down to a horizontal position. Should the basket fail to travel as stated and the rear ends of its plates 115 continue to slide back on flanges 74, it will be compelled to rock downward at its inner end as soon as such ends of said flanges strike the inner inclined flanges 75 of the truck and by the time the truck gets back to its original position the basket will also have attained it original position with respect thereto, as shown in Fig. 19. As the sheave segment attains its original position as shown in Fig. 8, the pin 152 projecting laterally from said sheave, engages and trips catch 148 from engagement with ratchet 147, and thus permits the weight 140 to reclose door 3. In this connection it is desirable to state that an alarm is sounded in the car before the door opens as a notice to the postal clerk that the trip 47 has been encountered and that the truck will be operated unless the clerk desires to prevent such operation through the instrumentality of the proper rock shaft of the truck as hereinbefore explained. The alarm preferably consists of a bell 153 of any suitable type to be actuated by a pull cord 154, connected to the cable 136 so as to respond the instant the cable begins to move and said cable 136 between the pull cord and the door, is preferably provided with a spring section 155 which will yield while the pawl is being operated and thus avoid moving the door until after the clerk has had an opportunity to unlock the truck from slidable channel 92. If the clerk ignores the warning, the spring 33 will force the tooth of the pawl into engagement with the moving ratchet wheel the instant the slide plate 39 is withdrawn, this action being instantly followed by downward movement of arm 27 and the compression of spring 26 so as to cause arm 22 to rotate in the same direction and rotate the shaft 21 for the purpose of effecting successively the opening of the door, the outward movement of the truck and basket, the return movement of said parts, and the tripping of the catch 148 to permit the door to reclose. It will thus be seen that the spring 26 establishes a yielding relation between the pawl carrying arm 27 and arm 22 to avoid imparting sudden movement to said arm and to the parts rotatable with shaft 21. Before the various operations enumerated have been completed, the slide plate 39 has been returned to its initial position by the spring-actuated lever 40 and by the time the door is permitted to close, the master gear has completed a revolution and the arm 29 of the pawl 28 has come in contact with said slide plate and effected the tripping of the tooth 32 from engagement with the ratchet wheel, it being noted that the tripping of the pawl from engagement with the ratchet wheel is cushioned by the spring 26 and that when the arm 22 engages the plate 39, the latter is not subjected to any material strain as the movement of the arm 22 following the tripping of the pawl, is due to the very slight momentum it acquired by the slow rotation of the shaft.

If it is desired to manually effect the action of the truck and hence of the basket, it may be accomplished by the following means: 156 is a suitably-journaled shaft equipped below the floor of the car with a drum 157. 158 is a hand wheel provided with a stem 159 capable of being fitted down into and interlocking with the shaft 156, so as to turn the same when the hand wheel is turned. Engaging the drum 157 is a cable 160 which extends forward and around a pair of suitably supported sheaves 161, and is attached in any suitable manner at its opposite ends to cables 97 and 98 so that in effect the cable 160 forms an integral connection between those parts, and as cables 97 and 98 lead from points adjacent to sheaves 161 to basket lugs 95 and 96 of the slide channel below the basket, it will be seen that by turning the wheel in the direction indicated by the adjacent arrow, Fig. 8, the truck is caused to move outward, opposite movement of the hand wheel reversing the movement of the truck. If such construction is employed it will be convenient to, in effect, nest the manually operated mechanism with the means for throwing shaft 21 out of gear with the master gear wheel 36, but the handle for operating the truck must be removed before the handle 63 for throwing said shaft out of gear can be secured in position, it being noted in this nested construction as shown by Fig. 12, that the shaft 62 is arranged within shaft 156 and is provided with a socket 162 non-rotatably receiving the squared lower end of shaft section 163 carrying the handle 63, the said handle in the preferred construction, see Fig. 13, occupying the recess 64 in the upper bearing secured in the floor of the car. In Fig. 25 which shows the rear side of the truck, the guard wall 73 shown is notched at its lower corners as at 164 for a purpose which hereinafter appears, and pivoted at 165 to said wall is an adjustable bar 166 adapted to be held by spring actuated pin 167 in the position shown in full or the position shown in dotted lines so that the opposite ends of said bar shall at different times form closures for the notches 164. When the bar occupies the position shown in dotted lines it is adapted as the truck moves outward to open the mail receiver carried by the car as hereinafter explained, and when in the position shown in full lines the truck may move outward without operating the receiver. The opposite end of the bar is designed for use with the receiver when used in the door opening at the opposite side of the car and therefore when the truck is moving outward toward the last-named opening and in this connection it is desirable to state that all of the parts described with the exception of the parts numbered from 1 to 16 inclusive, shaft 18, and the truck and basket are in duplicate, in order to adapt the truck and basket for operation through both of the side door openings of the car, and when it is desired to shift the truck laterally of the car for use in connection with the opposite door opening the mail clerk grasps the upper end of the handle of shaft 104 or 105 as the case may be, and rotates such shaft to depress the springs 101 and 94 as hereinbefore explained. He then applies pressure and pushes the truck laterally of the car in which action the double hooks 82 and 90 will pass over said springs and eventually over the duplicate set of said springs and engage the duplicate pockets 103 and 91 of the duplicate slidable channel bars 70-92, the said duplicate parts being omitted from the drawings.

Referring now to the receiver carried by the car and which may be in duplicate, or capable of transfer from one side of the car to the other; 168 is a vertical shaft journaled in brackets 169 and 170 secured respectively to the side of the car and to a wear plate 171 secured to said side. 172 is a crank arm secured to said shaft near its lower end and of such form that its free end normally projects into the adjacent door opening in the path of the depressed end of the adjustable bar 166 so that said bar in the outward movement of the truck shall strike said crank arm 172 and rock shaft 168, the bar 166 when substantially occupying the position shown in full lines Fig. 25, passing over the said crank arm without operating the same. At its upper end the shaft 168 carries a crank 173 pivotally connected to a rod 174 extending through a guide 175 secured to plate 171, a spring 176 being mounted on said rod and arranged to offer resistance to the outward movement imparted to crank arm 172 by the truck, that is by the bar 166 thereof. Plate 171 is provided with a plurality of horizontal ribs 177 which, at their forward ends, extend into the door opening, and at their forward extremities are provided with shoulders 178. Near their rear ends the ribs are formed with outwardly projecting lugs 179 containing slots 180, which diverge forwardly with respect to the side of the car, see Fig. 7, and near their front ends the ribs form supports for a plurality of similar pivot pins 181.

182 indicates the arms of the curved mail pouch receiver, the outer ends of said arms being connected together as at 184. At the outer or convex sides the arms 182 are pivotally connected at 185 to the front ends of a plurality of inclined braces 186, which are bifurcated at their rear ends to receive the lugs 179 of ribs 177 and are provided at such ends with pivot pins 187 engaging the slots 180 of said lugs. The arms 182 of the receiver are provided at their inner ends with bifurcated extensions 188 fitting over adjacent ends of the ribs 177 and pivotally engaging the pins 181, and journaled in the bifurcated ends of the arms 182 is a vertical shaft 189, provided at its upper end with a short crank 190 pivoted to a link 191 having a pin and slot connection at 192 with the topmost brace 186, see Figs. 4, 5, and 7.

Rigidly secured on shaft 189 and fitting in the bifurcated extensions 188 of arms 182 of the receiver are short and preferably curved arms 193, which when the receiver is set, that is opened, as shown in Figs. 5, 6 and 7, project transversely into the car above the basket and effect the deposit of the pouches onto the floor of the car forward of the truck, the curvature of the receiver and said inwardly projecting arms checking the speed of the pouches to such an extent that neither they nor their contents will be injured through the force with which they strike the car floor. To operatively connect the receiver with rock shaft 168, the bifurcated extension of the undermost arm 182 is provided with a lug 194, pivotally connected by a link 195 to the arm 173 of said rock shaft 168.

Assuming that mail has been delivered from the car through the agency of the basket and has been received through the agency of the receiver, it will be seen that as the truck starts to make its return movement within the car the pressure on the arm 172 is removed and as a result spring 176 rocks shaft 168 back to its original position and at the same time, through the medium of link 195 and lug 194 of the receiver, swings the latter toward the car, pivot-bolts 181 in this action of the link 191 being caused through the inward movement of the uppermost brace 186 and crank 190, to rock shaft 189 about ninety degrees in the proper direction to swing such arms 193 outward so that they shall bear a folded relation to the receiver when folded against the car, and shall lie outward of the plane of the slidable door to avoid interfering with the closure of the same.

Referring now to Figs. 29 to 33 inclusive, illustrating the preferred type of station crane for holding a mail pouch in position to be picked up by the receiver, 196 is a standard preferably of angle iron, and secured to the upper end of the same is a bracket 197, provided with a guide arm 198 of substantially semi-circular form in plan view and which slopes downward from its center toward its ends. Standard 196 is also provided with an arm 200 arranged above arm 198, and bearing a downwardly diverging relation thereto at its ends, see Fig. 29, the two arms together forming a curved guideway 201, having flaring mouths 202. Journaled in the upper part of said bracket is a sheave 203 engaged by a cable 204, which is attached at one end by preference to an arm 205 projecting from the standard, and at its opposite end to a crank arm 206, secured to the upper end of a vertical shaft 207, journaled in a pair of bearings 208, slidably engaging the arms of the angle standard, the free end of the crank 206, being provided with a depending V-shaped tooth 209 for engagement at times with the notch 199 of arm 198, it being noted that when the tooth of the crank arm 206 is in engagement with said notch, it will be impossible for the bearings 208 to slide downward. Adjacent to each bearing the shaft carries a horizontal arm 209, equipped at its outer end with a cross bar 210. 211 are transverse bars having oppositely disposed sets of rack teeth 212—213 and provided centrally at the opposite edges from said teeth with loops 214, the loop of one of the bars 211 projecting upward therefrom and fitting on the upper arm 209 and the loop of the other bar 211 depending and fitting on the lower arm 209, springs 215 occupying said loops and tending to hold the upper bar 211 pressed downward into engagement with a pair of angle iron jaws 216 pivoted upon shaft 207. The lower bar is held by its spring 215 pressed yieldingly upward against jaws 217 similar to jaws 216 and similarly pivoted on shaft 207, engagement of such bars with said jaws being to hold the same apart against the resistance of compression springs 218, pressing inwardly upon each jaw, the said springs being mounted upon rods 219 extending through ears 220 projecting from the jaws. The outer ends of the springs bear against washers 221, and nuts 222 engage the outer ends of said rods for the purpose of adjustment to vary the tension of the springs. For the purpose of releasing the jaws by withdrawing the toothed bars 211, similar brackets 223 are secured to bars 209 and have pin and slot connections as at 224 with the loops 214 of the channeled bars and carry pivotally levers 225, for engagement with lugs 226, projecting from said loops 214, see Fig. 32. By operating the levers 225 they engage the lugs 226 and respectively raise and depress the upper and lower toothed bars and thus permit springs 218 to swing the jaws inward or toward each other and clamp a mail pouch not shown, between them, this operation being performed when the jaws are lowered. The operator then grasps and pulls upon cable 204 and thus elevates the jaws and the mail pouch carried thereby, it being understood that before the elevation is completed the crank arm 206 must be disposed parallel with the trackway adjacent to which the crane is arranged in order that said arm may enter one of the flaring mouths 202 of the guideway 201 between arms 198 and 200. The continued elevation of the jaws is then accomplished by rotary movement of the same imparted through the passage of the arm 206 through the inclined guideway, and as the arm attains a position transversely of the trackway its tooth enters the notch 199. The cable is then released and the jaws maintain the position to which they have been adjusted, the upper jaws being disposed above and the lower ones below the plane of travel of the receiver of the car as shown in dotted lines Fig. 29, so that as the latter passes it will catch the pouch between the upper and lower jaws and withdraw it in an obvious manner, it being obvious that as the withdrawal is taking place a swinging movement is imparted to the jaws which overcomes the frictional resistance between notch 199 and tooth 209, so as to cause the latter to ride out of the former and move downward as permitted by the inclination of the guide. It is also obvious that the rock shaft 207 and the parts carried thereby move in a similar direction and that as the crank arm eventually passes out of the guideway the jaws will have described a quarter revolution and will be standing substantially parallel with the trackway. As this position of the jaws is attained and the crank arm leaves the guideway, the rock shaft and the parts carried thereby drop vertically downward, the cable 204 having sufficient slack to permit the movable part of the crane to drop downward to a point where a person upon the ground can readily secure a second mail pouch between the jaws.

In practice there may be a series of cranes at a station, the only limit to the number being that they shall not conflict with each other when swinging and shall all be within the path of the receiver during the time that it is standing in set or opened position.

By reference to Fig. 29 it will be seen that the basket when in dumping position passes below the jaws of the crane or cranes and that there is no conflict of operation between said basket and the receiver, it being further noted that a receptacle 227 is arranged to receive the pouch or pouches discharged by the basket and thus guards against the suction of such pouches under the car, the arrangement being such that the receptacle will be forward of the crane or series of cranes and receive the pouch or pouches from the car before the latter collects the pouch or pouches from the crane or cranes.

For a brief résumé of the operation it may be stated that as the train approaches a station, the station trip 47 effects the withdrawal of the slidable stop plate 39 to permit the pawl 28 to engage the ratchet wheel 35 and the shaft 21 be caused to describe one revolution, the stop plate returning to its original position shortly after the rotation of the shaft begins for the purpose of arresting the shaft in the manner explained at the end of one revolution. In the initial part of the operation of the shaft the alarm mechanism is operated to attract the attention of the mail clerk. If no mail is to be delivered to or collected from such station, the clerk may through the operation of rock shaft 62 before the station trip is encountered, throw the pawl out of gear with the ratchet wheel so that shaft 21 shall remain stationary. If for any reason the clerk does not wish the truck and receiver to operate after the alarm has notified him that the trip has been encountered, he grasps and operates the handle of the rock shaft 104 or 105 as the case may be and thus disengages the truck from the slide 92 so that the operation of the latter shall not impart movement to the truck and hence to the receiver, it being understood that the door will open and close as usual. Assuming that mail is to be delivered or received or both delivered and received, the truck will be left in gear with the slides 92, so that it shall move outward after the door is opened, open the receiver and effect the dumping of the basket and then return to its original position and incidentally return the basket to normal position and permit the receiver to close. At stations where the train makes a stop, it will be unnecessary and in some cases undesirable to automatically operate the truck and in this case the same will be operated manually after the train stops through the instrumentality of the hand wheel 158, as hereinbefore explained, and if it is desired to deliver mail without setting the receiver, either automatically or manually, the bar 166 of the truck can be so adjusted that the receiver will not be operated when the truck operates.

From the above description it will be apparent that I have produced a mail exchange system embodying the features of advantage enumerated as desirable in the statement of the object of the invention and I wish it to be understood that I do not desire to be restricted to the exact details of construction shown and described as obvious modifications will suggest themselves to one skilled in the art.

Having thus described the invention what I claim as new and desire to secure by Letters Patent is:—

1. In a mail exchange apparatus, a car having a door opening, a door controlling the same, and means actuated by the revolution of the axle of the car, for opening the said door.

2. In mail exchange apparatus, a car having a door opening, a door controlling the same, means to close the door when unopposed, periodically-operated means, means actuated by the early part of each movement of said periodically-operated means for opening the car door, and means to disengage the periodically-operated means and the door opening means before the movement of the former ceases.

3. In mail exchange apparatus, a car having a door opening, a door controlling the same, means to close the door when unopposed, periodically-operated means, means actuated by the early part of each movement of said periodically-operated means for opening the car door, means to disengage the periodically-operated means and the door opening means before the movement of the former ceases, and means to secure the door against closing movement as such disengagement occurs.

4. In mail exchange apparatus, a car having a door opening, a door controlling the same, means to close the door when unopposed, driven means carried by the car, means to be periodically operated by the driven means, a movable stop normally holding the periodically operated means out of gear with the driven means, a trip on the roadbed over which the car travels, means to be operated by the trip to withdraw said stop to permit the driven means to operate said periodically operated means, means to restore the stop to its original position after said trip is passed to arrest the periodically operated means at a predetermined time, and means actuated by the early part of the movement of said periodically operated means for opening the car door.

5. In mail exchange apparatus, a car having a door opening, a door controlling the same, means to close the door when unopposed, driven means carried by the car, means to be periodically operated by the driven means, a movable stop normally holding the periodically operated means out of gear with the driven means, a trip on the roadbed over which the car travels, means to be operated by the trip to withdraw said stop to permit the driven means to operate said periodically operated means, means to restore the stop to its original position after said trip is passed to arrest the periodically operated means at a predetermined time, means actuated by the early part of the movement of said periodically operated means for opening the car door, and means to disengage the periodically operated means and the door opening means before the movement of the former ceases.

6. In mail exchange apparatus, a car having a door opening, a door controlling the same, means to close the door when unopposed, driven means carried by the car, means to be periodically operated by the driven means, a movable stop normally holding the periodically operated means out of gear with the driven means, a trip on the roadbed over which the car travels, means to be operated by the trip to withdraw said stop to permit the driven means to operate said periodically operated means, means to restore the stop to its original position after said trip is passed to arrest the periodically operated means at a predetermined time, means actuated by the early part of the movement of said periodically operated means for opening the car door, means to disengage the periodically operated means and the door opening means before the movement of the former ceases, and means to secure the door against closing movement as such disengagement occurs.

7. In mail exchange apparatus, a car having a door opening, a transverse trackway upon the car floor opposite said door opening, a truck mounted upon the trackway, driven means carried by the car, means to be periodically operated by the driven means, a movable stop normally holding the periodically operated means out of gear with the driven means, a trip on the roadbed upon which the car travels, means to be operated by the trip and withdraw said stop to permit the driven means to operate said periodically operated means, means to restore the stop to its original position after said trip is passed to arrest the periodically operated means at a predetermined time, means actuated by the early part of the movement of the periodically operated means for opening the car door, means for holding the car door open without interrupting the movement of the periodically operated means, means actuated by the latter to cause the truck to move outward into the door opening and back to its original position, and means for tripping said door-holding means as the movement of the periodically operated means terminates.

8. In mail exchange apparatus, a car having a door opening, a door controlling the same, means to close the door when not opposed, a driven means, a shaft, suitable connections between the shaft and the door to open the same, a yieldingly-advanced stop to prevent operation of the shaft, means for tripping and releasing the stop, and means whereby the driven means shall rotate the shaft after the stop is tripped.

9. In mail exchange apparatus, a car having a door opening, a door controlling the same, means to close the door when not opposed, driven means, a shaft, suitable connections between the shaft and the door to open the same, a yieldingly advanced stop to prevent operation of the shaft, means for tripping and releasing the stop, means whereby the driven means shall rotate the shaft after the stop is tripped, means to hold the door open without affecting the movement of the shaft, and means for tripping the door-holding means as the movement of the shaft is arrested by said stop.

10. In mail exchange apparatus, a car having a door opening, a door controlling the same, means to close the door when not opposed, a shaft, means to revolve the shaft, means to arrest the shaft when it has described one revolution, a sheave, suitable connections between the sheave and the door to open the latter, a part movable with the shaft to engage and operate said sheave, means to trip said part from engagement with the sheave before the movement of the shaft ceases, and means to hold the door open after said tripping action has occurred.

11. In mail exchange apparatus, a car having a door opening, a door controlling the same, means to close the door when not opposed, a shaft, means to revolve the shaft, means to arrest the shaft when it has described one revolution, a sheave, suitable connections between the sheave and the door to open the latter, a part movable with the shaft to engage and operate said sheave, means to trip said part from engagement with the sheave before the movement of the shaft ceases, means to hold the door open after said tripping action has occurred, and means, actuated by the shaft, to trip said holding means as the movement of the shaft ceases.

12. In mail exchange apparatus, a car having a door opening, a transverse trackway upon the car floor opposite the door-opening, a truck mounted upon the trackway, periodically operated means carried by the car, a tiltable basket carried by the truck and suitable connections between said means and the truck for moving the latter toward the door opening until the basket has been caused to tilt downward through the door opening.

13. In mail exchange apparatus, a car having a door opening, a transverse trackway upon the car floor opposite the door-opening, a truck mounted upon the trackway, periodically operated means carried by the car, suitable connections between said means and the truck for moving the latter toward the door opening, a basket carried by and movable endwise and lengthwise of the truck, and means actuated by the movement of the truck toward the door opening for causing the basket to move in the same direction but at greater speed until its advanced end is projected through the door opening.

14. In mail exchange apparatus, a car having a door opening, a transverse trackway upon the car floor opposite the door-opening, a truck mounted upon the trackway, periodically operated means carried by the car, suitable connections between said means and the truck for moving the latter toward the door opening, a basket carried by and movable endwise and lengthwise of the truck, means actuated by the movement of the truck toward the door opening for causing the basket to move in the same direction but at greater speed until its advanced end is projected through the door opening and its center of gravity is beyond the front end of the truck, to cause it to tilt downward at its outer end, and means for arresting the tilting movement of the basket.

15. In mail exchange apparatus, a car having a door opening, a transverse trackway upon the car floor opposite the door-opening, a truck mounted upon the trackway, periodically operated means carried by the car, suitable connections between said means and the truck for moving the latter toward the door opening, a basket carried by and movable endwise and lengthwise of the truck, means actuated by the movement of the truck toward the door opening for causing the basket to move in the same direction but at greater speed until its advanced end is projected through the door opening and its center of gravity is beyond the front end of the truck, to cause it to tilt downward at its outer end, and means forming a part of the truck, for arresting the tilting movement of the basket.

16. In mail exchange apparatus, a car having a door opening, a transverse trackway upon the car floor opposite the door opening, a truck mounted upon the trackway, periodically operated means carried by the car, suitable connections between said means and the truck for moving the latter toward the door opening, and means also actuated by the periodically operated means, for returning the truck to its original position.

17. In mail exchange apparatus, a car having a door opening, a transverse trackway upon the car floor opposite the door opening, a truck mounted upon the trackway, periodically operated means carried by the car, suitable connections between said means and the truck for moving the latter toward the door opening, means for also actuated by the periodically operated means for returning the truck to its original position, a basket mounted upon the truck, and means actuated by the movement of the truck for causing the basket to move in the same direction but at greater speed.

18. In mail exchange apparatus, a car having a door opening, a transverse trackway upon the car floor opposite the door opening, a truck mounted upon the trackway, periodically operated means carried by the car, suitable connections between said means and the truck for moving the latter toward the door opening, means also actuated by the periodically operated means for returning the truck to its original position, a basket mounted upon the truck, means actuated by the movement of the truck toward the door opening, to cause the basket to move in the same direction until its front end is projected through the door-opening and its center of gravity is beyond the advanced end of the truck to permit it to tilt downward at its outer end and to retilt and return it to its original position as the truck moves inward, means for limiting the tilting movement of the basket, and means to insure its retilting movement before it attains its original position upon the truck.

19. In mail exchange apparatus, a car having a door opening, a door controlling the same, means to close the door when unopposed, a truck arranged upon the floor of the car and capable of movement toward, and from the door opening, periodically operated means, means actuated by the early part of each movement of said periodically operated means for opening the car door, and means actuated by the periodically operated means after the door is opened for causing the truck to move into the door opening.

20. In mail exchange apparatus, a car having a door opening, a door controlling the same, means to close the door when unopposed, a truck arranged upon the floor of the car and capable of movement toward and from the door opening, periodically operated means, means actuated by the early part of each movement of said periodically operated means for opening the car door, means actuated by the periodically operated means after the door is opened for causing the truck to move into the door opening, means for returning the truck to its original position before the movement of the periodically operated means ceases, and means for releasing the door before the movement of the periodically operated means ceases to permit it to close.

21. In mail exchange apparatus, a car having a door opening, a door controlling the same, means to close the door when unopposed, a truck arranged upon the floor of the car and capable of movement toward and from the door opening, periodically operated means, means actuated by the early part of each movement of said periodically operated means for opening the car door, means actuated by the periodically operated means after the door is opened for causing the truck to move into the door opening, means for returning the truck to its original position before the movement of the periodically operated means ceases, means for releasing the door before the movement of the periodically operated means ceases to permit it to close, a basket upon the truck, and means for causing the basket to move in the same direction but at greater speed than the truck during the movement of the latter.

22. In mail exchange apparatus, a car having a door opening, a door controlling the same, means to close the door when unopposed, a truck arranged upon the floor of the car and capable of movement toward and from the door opening, periodically operated means, means actuated by the early part of each movement of said periodically operated means for opening the car door, means actuated by the periodically operated means after the door is opened for causing the truck to move into the door opening, means for returning the truck to its original position before the movement of the periodically operated means ceases, means for releasing the door before the movement of the periodically operated means ceases, to permit it to close, a basket upon the truck, means for causing the basket to move in the same direction but at greater speed than the truck during the movement of the latter, the outward movement of the basket continuing until its center of gravity is beyond the front end of the truck to cause its projected end to tilt downward through the door opening, means for limiting the tilting movement, and means for insuring its retilting movement before its opposite movement and the corresponding movement of the truck ceases.

23. In mail exchange apparatus, a car having a door opening, a truck within the car and movable transversely, means for moving the truck outwardly into the door opening, a receiver hinged to the car, yielding means holding the receiver folded against the car, and an arm held by the yielding means in the path of outward movement of the truck and adapted to be struck and be swung outward by the truck in its outward movement and effect similar movement of the receiver.

24. In mail exchange apparatus, a car having a door opening, a truck within the car and movable transversely, means for moving the truck outwardly into the door opening, adjustable means carried by the truck, a receiver hinged to the car, yielding means holding the receiver folded against the car, and an arm held by the yielding means in the path of outward movement of the adjustable means carried by the truck when said means occupies a particular adjustment, and adapted in the outward movement of the truck to be struck by said adjustable means when properly adjusted and swing outward thereby and impart similar movement to the receiver.

25. In mail exchange apparatus, a car having a door opening, a truck within the car and movable transversely, means for moving the truck outwardly into the door opening, a receiver hinged to the car, yielding means holding the receiver folded against the car, an arm held by the yielding means in the path of outward movement of the truck in its outward movement and effect similar movement of the receiver, an extension pivoted to the inner end of the receiver, and means for causing said extension to swing inward when the receiver swings outward and outward when the receiver swings inward.

26. In a mail exchange apparatus, a car having a side door opening, a door controlling the same, a driven ratchet wheel carried by the car, a shaft, an arm rigid therewith, an arm rotatable on the shaft, yielding means tending to hold said arms at an angle to each other, a pawl pivoted to the said rotatable arm, yielding means connecting the pawl with the said rigid arm and tending to force and hold the pawl in engagement with the ratchet wheel, means held yieldingly in the path of said arms to hold the pawl out of engagement with the ratchet wheel, means for tripping the last-named means to permit the pawl to engage the ratchet wheel and through said arms impart rotatable movement to said shaft, and means whereby the rotation of said shaft shall open the door.

27. In a mail exchange apparatus, a car having a side door opening, a door controlling the same, a driven ratchet wheel carried by the car, a shaft, an arm rigid therewith, an arm rotatable on the shaft, yielding means tending to hold said arms at an angle to each other, a pawl pivoted to the said rotatable arm, yielding means connecting the pawl with the said rigid arm and tending to force and hold the pawl in engagement with the ratchet wheel, means held yieldingly in the path of said arms to hold the pawl out of engagement with the ratchet wheel, means for tripping the last-named means to permit the pawl to engage the ratchet wheel and through said arms impart rotatable movement to said shaft, means rotatable on the shaft, suitable means connecting the last-named means with the door, means rigid with the shaft for rotating the last-named means rotatable thereon to effect the opening of the door, means to effect the release of the last-named means rotatable on the shaft, yielding means for closing the door, and means for holding the door open for a predetermined period of time after said release has occurred.

28. In a mail exchange apparatus, a car having a side door opening, a door controlling the same, a driven ratchet wheel carried by the car, a shaft, an arm rigid therewith, an arm rotatable on the shaft, yielding means tending to hold said arms at an angle to each other, a pawl pivoted to said rotatable arm, yielding means connecting the pawl with the said rigid arm and tending to force and hold the pawl in engagement with the ratchet wheel, means held yieldingly in the path of said arms to hold the pawl out of engagement with the ratchet wheel, means for tripping the last-named means to permit the pawl to engage the ratchet wheel and through said arms impart rotatable movement to said shaft, means rotatable on the shaft, suitable means connecting the last-named means with the door, means rigid with the shaft for rotating the last-named means rotatable thereon to effect the opening of the door, means to effect the release of the last-named means rotatable on the shaft, yielding means for closing the door, means for holding the door open for a predetermined period of time after said release has occurred, and means for tripping said holding means to permit the door to be closed.

29. In mail exchange apparatus, a car having a side door opening, a door controlling the same, a driven ratchet wheel carried by the car, a shaft, an arm rigid therewith, an arm rotatable on the shaft, yielding means tending to hold said arms at an angle to each other, a pawl pivoted to the said rotatable arm, yielding means connecting the pawl with the said rigid arm and tending to force and hold the pawl in engagement with the ratchet wheel, means held yieldingly in the path of said arms to hold the pawl out of engagement with the ratchet wheel, means for tripping the last-named means to permit the pawl to engage the ratchet wheel and through said arms impart rotatable movement to said shaft, means rotatable on the shaft, suitable means connecting the last-named means with the door, means rigid with the shaft for rotating the last-named means rotatable thereon to effect the opening of the door, means to effect the release of the last-named means rotatable on the shaft, yielding means for closing the door, means for holding the door open for a predetermined period of time after said release has occurred, a pair of oppositely rotatable sheaves journaled on said shaft, a truck within the car, a pair of suitably guided cables attached to said sheaves, means connecting the opposite ends of said cables with said truck, means rigid with the shaft for imparting rotation to one of said sheaves to cause the truck to move into the door opening while the door is open, means to trip said sheave-actuating means from engagement therewith, and means movable with the shaft for engagement with the other of said sheaves to effect the withdrawal of the truck, and means to trip the said last-named sheave-actuating means after the truck has been withdrawn.

30. In mail exchange apparatus, a car having a side door opening, a door controlling the same, a driven ratchet wheel carried by the car, a shaft, an arm rigid therewith, an arm rotatable on the shaft, yielding means tending to hold the said arms at an angle to each other, a pawl pivoted to the said rotatable arm, yielding means connecting the pawl with the said rigid arm and tending to force and hold the pawl in engagement with the ratchet wheel, means held yieldingly in the path of said arms to hold the pawl out of engagement with the ratchet wheel, a trip arm connected to said last-named means, and a trip on the roadway of the car for operating said trip arm to release the pawl and said rigid arm to permit the former to engage the ratchet wheel and the shaft to be turned.

31. The combination with a car having a side door opening, a truck movable transversely in the car, rotatable drums carried by the car truck, sprocket wheels rotatable with the drums, an endless chain connecting the sprocket wheels and bearing a fixed relation to the car, a mail pouch basket movable with and upon the truck, a cable attached to the drum at the inner end of the truck and to the outer end of the basket, a similar cable attached to the inner end of the basket and to the other drum of the truck, means for moving the truck outward into the door opening and, through said chain and cables, cause the basket to move in the same direction but at greater speed so as to project through the door opening and beyond the side of the car, and means to reverse the movement of the truck and through said sprocket chain and cables return the basket to its original position upon the truck.

32. The combination with a car having a side door opening, a truck movable transversely in the car, rotatable drums carried by the car truck, sprocket wheels rotatable with the drums, an endless chain connecting the sprocket wheels and bearing a fixed relation to the car, a mail pouch basket movable with and upon the truck, a cable attached to the drum at the inner end of the truck and to the outer end of the basket, a similar cable attached to the inner end of the basket and the other drum of the truck, means for moving the truck outward into the door opening, and through said chain and cables, cause the basket to move in the same direction but at greater speed so as to project through the door opening, and beyond the side of the car, and until its center of gravity is beyond the outer end of the truck to permit it to tilt downward, means whereby the truck shall limit the tilting movement of the basket, and means to reverse the movement of the truck and through the sprocket chain and cables return the basket to its original position upon the truck.

33. The combination with a car having a side door opening, a truck movable transversely within the car, means flexibly connected to the truck for causing the latter to move outward toward the door opening, and means flexibly connected to the truck for reversing such movement.

34. The combination with a car having a side door opening, a truck movable transversely within the car, means flexibly connected to the truck for causing the latter to move outward toward the door opening, means flexibly connected to the truck for reversing such movement, a basket mounted upon the truck, and means actuated by each movement of the truck for causing the basket to move in the same direction but at greater speed.

35. The combination with a truck provided with guard walls, a plurality of rolls carried by said guard walls, and a basket mounted upon the truck and provided with plates projecting outward in the plane of said rolls and provided with slots of sufficient size to permit the said rolls to pass through them at certain times.

36. In mail-exchange-apparatus, a car having a door opening, a truck within the car and movable transversely, means for moving the truck outwardly into the door opening, a receiver hinged to the car, yielding means holding the receiver folded against the car, and an arm held by the yielding means in the path of outward movement of the truck and adapted to be struck and be swung outward by the truck in its outward movement and effect similar movement of the receiver, in combination with means erected near the roadway of the car for detachably supporting a mail pouch in position to be engaged by the inner side of the receiver when open.

37. In mail exchange apparatus, a car having a door opening, a truck within the car and movable transversely, means for moving the truck outwardly into the door opening, a receiver hinged to the car, yielding means holding the receiver folded against the car, and an arm held by the yielding means in the path of outward movement of the truck and adapted to be struck and be swung outward by the truck in its outward movement and effect similar movement of the receiver, in combination with a crane at one side of the roadway and provided with a pair of upper jaws above the plane of the receiver and a pair of lower jaws below the plane of the receiver to engage the upper and lower portions of and support a mail pouch arranged vertically in the path of the receiver; said jaws bearing a pivoted relation to the crane, so as to swing away from the car as the receiver engages and withdraws the pouch and also bearing a vertically sliding relation to the crane, a guideway rigid with the crane, and means movable with the jaws and engaging said guideway at times and adapted to move out of the guideway as the jaws swing away from the car, to permit said jaws to move downward on the crane.

38. In mail exchane apparatus, a car having a door opening, a truck within the car and movable transversely, means for moving the truck outwardly into the door opening, a receiver hinged to the car, yielding means holding the receiver folded against the car, and an arm held by the yielding means in the path of outward movement of the truck and adapted to be struck and be swung outward by the truck in its outward movement and effect similar movement of the receiver, in combination with a crane erected at one side of the roadway and provided with a pair of upper jaws above the plane of the receiver and a pair of lower jaws below the plane of the receiver to engage the upper and lower portions of and support a mail pouch arranged vertically in the path of the receiver; said jaws bearing a pivoted relation to the crane so as to swing away from the car as the receiver engages and withdraws the pouch and also bearing a vertically sliding relation to the crane, a guideway rigid with the crane, means movable with the jaws and engaging said guideway at times and adapted to move out of the guideway as the jaws swing away from the car, to permit the jaws to move downward on the crane, and means for re-elevating the jaws.

39. In mail exchange apparatus, a car having a door opening, a truck within the car and movable transversely, means for moving the truck outwardly into the door opening, a receiver hinged to the car, yielding means holding the receiver folded against the car, and an arm held by the yielding means in the path of outward movement of the truck and adapted to be struck and be swung outward by the truck in its outward movement and effect similar movement of the receiver, in combination with a crane erected at one side of the roadway and provided with a pair of upper jaws above the plane of the receiver and a pair of lower jaws below the plane of the receiver to engage the upper and lower portions of and support a mail pouch arranged vertically in the path of the receiver; said jaws bearing a pivoted relation to the crane so as to swing away from the car as the receiver engages and withdraws the pouch and also bearing a vertically sliding relation to the crane, a guideway rigid with the crane, means movable with the jaws and engaging said guideway at times and adapted to move out of the guideway as the jaws swing away from the car to permit said jaws to move downward on the crane, and a cable suitably guided and connected to the arm movable with the jaws for effecting the re-elevation of the latter.

40. In mail exchange apparatus, a car having a door opening, a truck within the car and movable transversely, means for moving the truck outwardly into the door opening, a receiver hinged to the car, yielding means holding the receiver folded against the car, and an arm held by the yielding means in the path of outward movement of the truck and adapted to be struck and be swung outward by the truck in its outward movement and effect similar movement of the receiver, in combination with a crane at one side of the roadway and provided with a pair of upper jaws above the plane of the receiver and a pair of lower jaws below the plane of the receiver to engage the upper and lower portions of and support a mail pouch arranged vertically in the path of the receiver said jaws bearing a pivotal relation to the crane so as to swing away from the car as the receiver engages and withdraws the pouch and also bearing a vertically sliding relation to the crane, a downwardly-sloping guideway rigid with the crane, means movable with the jaws and engaging the crest of the guideway when the jaws are elevated and projecting toward the car, and adapted to swing out of the guideway as the jaws swing away from the car to permit said jaws to move downward on the crane, and a cable suitably guided and connected to the arm movable with the jaws for effecting the re-elevation of the latter.

41. In mail exchange apparatus, a car having a door opening, a door controlling the same, periodically operable means, means for effecting the operation of the periodically operable means by establishing a geared relation between said means and one of the axles of the car, and means actuated by the early part of each operation of such periodically operable means for opening the car door.

42. In mail exchange apparatus, a car having a door opening, a door controlling the same, periodically operable means, means for effecting the operation of the periodically operable means by establishing a geared relation between said means and one of the axles of the car, means actuated by the early part of each operation of such periodically operable means for opening the car door, and means to close the door when unopposed.

43. In mail exchange apparatus, a car having a door opening, a truck within the car and movable toward and from said opening, a basket carried by and movable longitudinally of the truck, and means actuated by movement of the truck toward the door opening, for causing the basket to move upon and in the same direction as but at greater speed than the truck.

44. In mail exchange apparatus, a car having a door opening, a truck within the car and movable toward and from said opening, a basket carried by and movable longitudinally of the truck, and means actuated by movement of the truck toward the door opening, for causing the basket to move upon and in the same direction as but at greater speed than the truck, until said basket has projected sufficiently beyond the advanced end of the truck to tilt downward at such end.

45. In mail exchange apparatus, a car having a door opening, a truck within the car and movable toward and from said opening, a basket carried by and movable longitudinally of the truck, means actuated by movement of the truck toward the door opening, for causing the basket to move upon and in the same direction as but at greater speed than the truck until said basket has projected sufficiently beyond the advanced end of the truck to tilt downward at such end, and means for arresting the tilting movement of the basket.

46. In an automatic mail exchange device, the combination with a railway mail car, of an automatic mechanism, a trip placed along the track to start said mechanism in operation, means constructed to open and close the door of said car by the operation of said mechanism, and a discharging device constructed and arranged to discharge a plurality of mail bags through said door while it is open.

47. In an automatic mail exchange device, the combination with a railway mail car, of an automatic mechanism, a trip placed along the track to start said mechanism in operation, means constructed to open and close the door of said car by the operation of said mechanism, and a receiving device constructed and arranged to receive a plurality of mail bags through said door while it is open.

In testimony whereof I affix my signature, in the presence of two witnesses.

ALBERT HUPP.

Witnesses:
HELEN C. RODGERS,
G. Y. THORPE.

Copies of this patent may be obtained for five cents each, by addressing the "Commissioner of Patents, Washington, D. C."